United States Patent [19]

Wiscombe et al.

[11] Patent Number: 5,668,417
[45] Date of Patent: Sep. 16, 1997

[54] METHOD AND APPARATUS FOR DISTINGUISHING BETWEEN FAILURE OF A POWER SUPPLY VERSUS FAILURE OF ITS POWER SOURCE FROM THE SECONDARY OF THE POWER SUPPLY

[75] Inventors: Nathan Wiscombe, Cedar Park; Ronald D. Shaw, Austin, both of Tex.

[73] Assignee: Dell USA L.P., Austin, Tex.

[21] Appl. No.: 557,217

[22] Filed: Nov. 14, 1995

[51] Int. Cl.⁶ .................................................. H02J 7/00
[52] U.S. Cl. .................................. 307/64; 307/80; 307/85; 364/DIG. 1; 364/DIG. 2; 364/273.4; 364/948.5
[58] Field of Search .................................. 307/43, 64, 65, 307/66, 80, 85, 86, 87; 395/750; 364/492, DIG. 1, DIG. 2, 273.4, 948.4, 948.5

[56] References Cited

U.S. PATENT DOCUMENTS

| | | | |
|---|---|---|---|
| 4,782,355 | 11/1988 | Sakai et al. | 396/72 |
| 5,475,271 | 12/1995 | Shibasaki et al. | 307/31 |
| 5,481,730 | 1/1996 | Brown et al. | 395/750 |

Primary Examiner—William M. Shoop, Jr.
Assistant Examiner—Jonathan S. Kaplan
Attorney, Agent, or Firm—Stanford & Bennett

[57] ABSTRACT

A power loss detection system for a power supply including a main converter for providing regulated power, an activation circuit for turning on and off the main converter based on an active low activation signal, a standby power circuit for providing a standby power signal, and an internal pullup resistor coupled between the standby power and activation signals. The power supply asserts a power status signal indicative of the status of regulated power. Alternatively, an external detection circuit monitors the regulated power from the power supply and asserts a power loss signal indicative thereof. The control circuit asserts the activation signal low to turn on the main converter or floats the activation signal to turn off the main converter. If the power good or power loss signal indicates loss of regulated power, the control circuit floats the activation signal. If the activation signal goes or remains low after the activation signal is floated, then the power source has failed. If the activation signal is pulled high, then the power supply has failed. If the power supply has failed, then the control circuit asserts a failure signal indicative thereof. The present invention is particularly advantageous in a redundant power supply system for supplying power to a computer system, where both power supplies provide standby power.

20 Claims, 2 Drawing Sheets

METHOD AND APPARATUS FOR DISTINGUISHING BETWEEN FAILURE OF A POWER SUPPLY VERSUS FAILURE OF ITS POWER SOURCE FROM THE SECONDARY OF THE POWER SUPPLY

FIELD OF THE INVENTION

The present invention relates to power supplies, and more particularly to distinguishing between a failed power supply versus a failed power source from the secondary side, especially in a redundant power supply system.

DESCRIPTION OF THE RELATED ART

Redundant power supplies are often used to maintain power to an electronic system, such as a personal computer (PC), when it is desired to keep the PC running without interruption or for otherwise reducing the possibility of unexpected failures. In this manner, when one power supply fails, the second power supply maintains power until the first one is replaced or otherwise serviced. This is desirable, for example, in a server system providing service to a plurality of users, where it is desired to keep the server running at all times without interruption, or at least to reduce the chance of unexpected failure.

Each power supply in a redundant power supply system derives power from a source which is typically an alternating current (AC) source, a direct current (DC) source is also contemplated. Although the source power provided to the redundant supplies may be one and the same, it is also common for separate and independent sources to be provided to each redundant supply for added protection and security. This is desirable since it is common for an AC source to fail relatively often.

A computer system operating with redundant power supplies typically includes circuitry or other detection means for determining whether either one of the power supplies have failed and the system is fully operating from the other supply. However, it is very difficult for an intelligent redundant power supply system to distinguish between a failed power supply and a failed power supply source, since either failure produces the same result. It is desired to make this distinction since the appropriate action depends upon whether the power supply or its source has failed. In particular, a failed power supply should be shut down and reported, so that it can be replaced or otherwise serviced. However, if the source should fail, the power supply itself is most likely still operational and should be restarted once the AC source is next available.

It is therefore desirable to distinguish between a failed power supply and a failed source. Otherwise, anytime the AC source is temporarily shut down, a service technician might be called to service or replace the supply when it is otherwise operational and not in need of such servicing. Power supplies exist on the market today that include circuitry provided on the primary side of the main transformer for detecting the loss of the AC source and for providing a signal through an optocoupler or similar isolating circuitry to inform the computer of source failure. However, such primary circuitry is not standard and significantly adds to the cost of the power supply.

Other manufacturers provide custom power supply circuitry for indicating source versus supply failure. This approach is not standard, however, and significantly adds to the cost of the overall system. Therefore, it is desirable to distinguish between a failed source versus a failed supply on the secondary side of a power supply, so that standard, off-the-shelf power supplies may be used. This is particularly advantageous in a redundant power supply system.

SUMMARY OF THE INVENTION

A power loss detection system according to the present invention distinguishes between failure of a power supply versus failure of the supply's power source. The power supply includes a main converter for providing regulated power, an activation circuit for turning on and off the main converter based on an active low activation signal, a standby power circuit for providing a secondary extra low voltage (SELV) power signal, and an internal pullup resistor coupled between the standby power and activation signals. The power supply preferably asserts a power good signal indicative of whether the power supply is operating normally or is no longer providing power. Alternatively, a detection circuit within an external control circuit monitors the regulated power from the power supply and asserts a status signal indicative thereof. The control circuit asserts the activation signal low to turn on the main converter or floats the activation signal using an open-collector output to turn off the main converter of the power supply. The control circuit also monitors the status of the power supply, so that if there is loss of regulated power, the control circuit floats the activation signal to determine whether the standby power circuit is enabled.

In particular, if the activation signal falls low or otherwise remains low after the activation signal is floated, then the power source has failed. If the activation signal is pulled high while power loss is still indicated, then the power supply has failed. If the power source has failed, the control circuit continually monitors the activation signal to determine when the power source returns, which is indicated by the activation signal being asserted high once again. When the power source is available again, the control circuit reasserts the activation signal low to power up the power supply. In this case, there is no need to call for a service technician to service or replace the power supply. If the power supply has failed, however, then the control circuit asserts a failure signal indicative thereof. A system receiving the failure signal alerts the appropriate personnel of the failure for replacement or service.

The present invention is particularly advantageous in a redundant power supply system for supplying power to a computer system or other electronic device. Preferably, a paralleling board is provided for receiving regulated power from two redundant power supplies, where the paralleling board preferably includes current share circuitry for sharing current between the two supplies. The paralleling board is coupled to the respective power buses of the redundant power supplies and monitors corresponding power good or power status signals indicative of the status of the power supplies, or whether power is being provided on the respective buses. The paralleling board initially asserts both activation signals low for turning on both power supplies. In the event either one of the power supplies or its corresponding power source fails, the other supply continues to provide standby power. Both power supplies preferably include an isolation diode for isolating its standby signal from the standby signal of the other power supply. Control circuitry on the paralleling board, receiving standby power, detects a power failure of a supply, and floats the corresponding activation signal. The control circuit then monitors the activation signal to determine whether the supply or its source has failed, as described above. The computer system alerts the user in the event of a power supply failure.

In this manner, a power loss detection system according to the present invention distinguishes between failure of a power supply or its source from the secondary side of a power supply. This alleviates the need for sophisticated primary circuitry, which substantially increases the cost of the power supply for distinguishing between source or supply failure.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
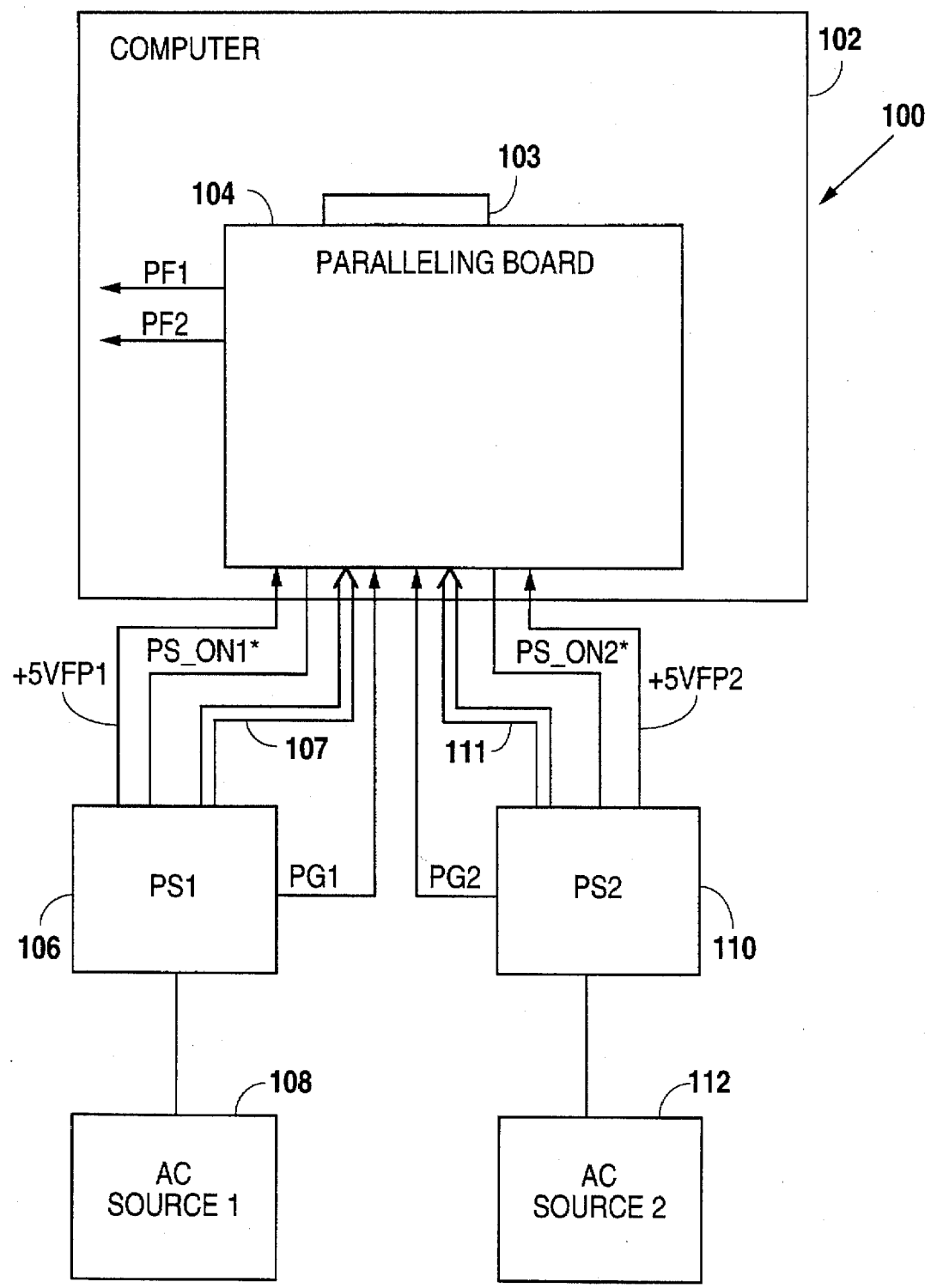
FIG. 1 is a simplified block diagram of a computer system including a redundant power supply system.

Referring now to FIG. 1, a simplified block diagram is shown of a computer system 100 incorporating a power loss detection system according to the present invention. A computer 102, such as a personal computer (PC) or the like, includes a paralleling board 104, which receives power from redundant power supplies PS1 106 and PS2 110 on corresponding power buses 107, 111, respectively. Each of the power buses 107, 111 provide the desired voltages for operating the computer 102, such as operating voltages of +5V, +12V, –12V, –5V, +3.3V, etc. The paralleling board 104 preferably includes current share circuitry for sharing current between the respective power signals and provides power to the computer 102 on an output power bus 103. The paralleling board 104 is preferably incorporated or housed within the computer 102, but could alternatively be a separate and external unit. It is noted that although only two redundant power supplies PS1 106 and PS2 110 are shown, the principles of the present invention are applicable to any number of backup, paralleled or redundant power supplies and thus is not limited to only two. Only two are shown and described for purposes of clarity and simplicity.

PS1 106 receives power from an AC SOURCE1 108 and PS2 110 receives power from an AC SOURCE2 112, where the AC sources 108 and 110 typically provide unregulated power and are preferably separate and independent from one another. It is noted that although the AC sources 108, 112 may be the same, they are separate and independent for providing substantially less risk of the computer system 102 losing power, since AC sources are known to be somewhat unreliable. The computer 102 is preferably a server system or the like, where it is desired to maintain power on a continual basis or at least to reduce the possibility of unexpected shut down. In this manner, if PS1 106 or its AC SOURCE1 108 should fail, then PS2 110 and its AC SOURCE2 112 maintains power to the computer 102 until the PS1 106 is replaced or otherwise serviced, or until the power from the AC SOURCE1 108 returns. The paralleling board 104 automatically maintains power to the computer 102 regardless of whether the power is being received from either of the power supplies PS1 106, PS2 110 or a combination of the two.

Different modes of operation are possible in a redundant system. For example, both PS1 106 and PS2 110 could be providing approximately half the total power through the paralleling board 104, so that anytime either power supply PS1 106 or PS2 110 should fail, the other automatically increases its output to supply the full load. Alternatively, one power supply could be a primary supply and the other a secondary operating at standby, so that if one fails, the paralleling board 104 switches to the other.

Each of the power supplies PS1 106 and PS2 110 continually provides a five volt standby power or flea power signal, referred to as +5VFP1 and +5VFP2, respectively, whenever its corresponding AC source 108 and 112, respectively, is connected and providing power. The +5VFP signals are provided by the power supplies even when their respective main converters, described further below, are shut off. The +5VFP1 and +5VFP2 signals are provided to the paralleling board 104. Also, each of the power supplies PS1 106 and PS2 110 monitors respective external activation signals, referred to as PS_ON1* and PS_ON2*, respectively, for determining whether to activate that particular power supply, where the PS_ON1* and PS_ON2* signals are connected and controlled by the paralleling board 104. An asterisk (*) at the end of a signal name denotes negative logic, where the signal is considered asserted when low and deasserted when high. Also, an "N" appended to the end of a signal name denotes negative logic. Thus, the paralleling board turns PS1 106 on by asserting the PS_ON1* signal low. Likewise, the paralleling board 104 turns PS2 110 on by asserting the PS_ON2* signal low.

In the preferred embodiment, the power supplies PS1 106 and PS2 110 both provide power good signals, referred to as PG1 and PG2, respectively, indicative of the status of power and thus whether the respective power supply is providing power. During normal operation, the paralleling board 104 asserts the PS_ON1* and PS_ON2* signals low to activate both power supplies, where PS1 106 and PS2 110 assert the respective PG1 and PG2 signals high indicating that the power supplies are on and providing power. The PG1 and PG2 signals are deasserted low when PS1 106 and PS2 110 are mined off, or, if the respective power supply fails or is otherwise unable to provide power. In this manner, the paralleling board 104 detects power loss of PS1 106 when it is asserting the PS_ON1* signal low and the PG1 signal is deasserted high. Likewise, the paralleling board 104 detects power loss of PS2 110 when it is asserting the PS_ON2* signal low and the PG2 signal is deasserted high.

As described further below, the paralleling board 104 may also include internal detection circuits 230, 232 (FIG. 2) for determining if either of the power supplies PS1 106 or PS2 110 is no longer providing power as desired. If such optional detection circuits 230 and 232 are provided, the PG1 and PG2 signals are optional and thus not necessary for the paralleling board 104 to determinate power loss of the power supplies PS1 106 or PS2 110. Thus, either method may be used for determining power loss of one or more power supplies.

According to the present invention, the paralleling board 104 monitors the PG1 and PG2 signals and further determines whether the failure is due to that power supply or its source. For example, if the paralleling board 104 detects the PG1 signal deasserted indicating that PS1 106 is no longer providing power on the power bus 107, it determines whether the failure is due to PS1 106 or the AC SOURCE1 108. If the failure is due to the AC SOURCE1 108, then the paralleling board 104 determines that the PS1 106 is still operational, so that once the AC SOURCE1 108 provides power again, the paralleling board 104 reactivates PS1 106 for normal operation. However, if the failure is due to PS1 106 and the AC SOURCE1 108 is still providing power, then the paralleling board 104 asserts a failure signal PF1 to the computer system 102, which respondingly alerts a user or a service technician that PS1 106 should be serviced and/or replaced. Likewise, if the PG2 signal is deasserted and the failure is due to PS2 110 rather than the AC SOURCE2 112, then the paralleling board 104 asserts a failure signal PF2 to the computer system 102, which again respondingly alerts a user or a service technician that PS2 110 should be serviced and/or replaced. Thus, it is understood that it is desirable to distinguish whether a power supply or its source has failed.

Figure 2:
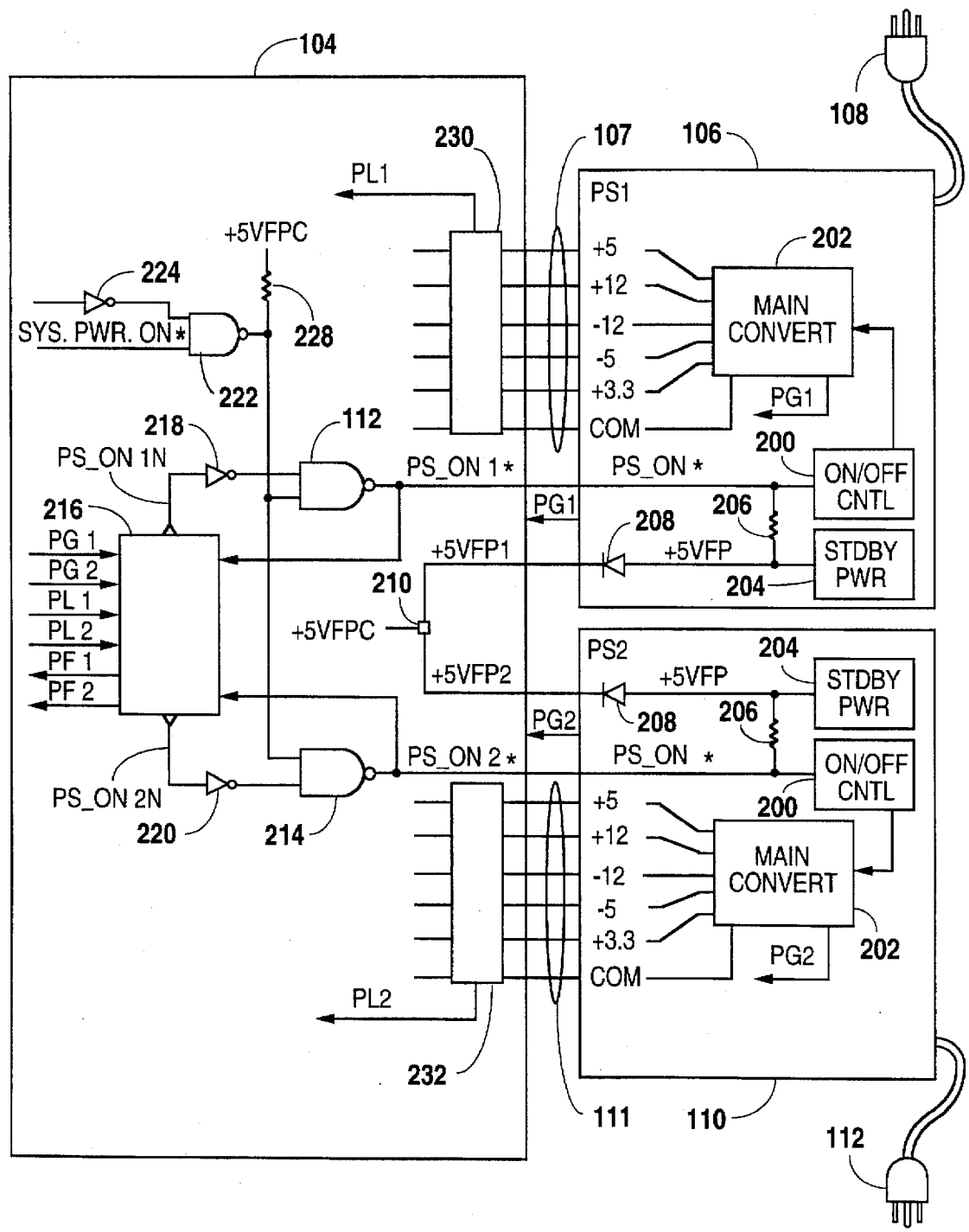
FIG. 2 is a more detailed diagram of the connection between redundant power supplies and a computer illustrating a power loss detection system according to the present invention.

Referring now to FIG. 2, a more detailed schematic diagram is shown illustrating the connection between the power supplies PS1 106, PS2 110 and the paralleling board 104 of the computer 102. Both of the power supplies PS1 106 and PS2 110 include an on/off control circuit 200, which monitors the respective activation signals PS_ON1* and PS_ON2* for determining whether to activate that particular power supply. This signal is referred to as PS_ON* within each power supply. Thus, the on/off control circuit 200 turns the power supply off when PS_ON* is deasserted high and turns the power supply on when PS_ON* signal is asserted low. When the PS_ON* signal is asserted low, the on/off control circuit 200 indicates to a main converter 202 to provide power on the respective power bus. When activated, PS1 106 provides the power signals on the power bus 107, whereas PS2 110 provides power signals on power bus 111 to the paralleling board 104. The main converter 202 of each of the power supplies. PS1 106 and PS2 110 preferably includes detection circuitry for asserting the power good signals, PG1 and PG2, respectively.

Both of the power supplies PS1 106 and PS2 110 include a standby power circuit 204, which continually provides the respective +5VFP signal, whenever its corresponding AC source is connected and providing power. This is true regardless of the state of the main converter 202. In fact, even though the standby power circuit 204 and the main converter 202 derive power from the same AC source, such as the AC SOURCE1 108, they have separate and independent power circuits. Furthermore, even if the main converter 202 fails, the standby power circuit 204 is likely still operational and providing standby power.

Thus, as long as the AC SOURCE1 108 is connected and providing power to the PS1 106, the standby power circuit 204 within PS1 106 asserts its +5VFP signal. The same is true for PS2 110, which also asserts its +5VFP signal as long as the AC SOURCE2 112 is connected and providing power. A pullup resistor 206 is connected between the respective +5VFP signal and the PS_ON* signal within each of the power supplies PS1 106 and PS2 110. Both PS1 106 and PS2 110 further include an isolation diode 208, having its anode receiving the corresponding +5VFP signal and its cathode providing the external standby power signals, +5VFP1 and +5VFP2, respectively, to external control circuitry. The +5VFP1 and +5VFP2 signals from PS1 106 and PS2 110, respectively, are connected together through a common junction 210 within the paralleling board 104, where the combined standby power signal is referred to as +5VFPC for providing standby power to SELV circuitry within the paralleling board 104. This wired-OR connection ensures standby power if either one of the AC sources 108 or 112 should fail.

The paralleling board 104 includes a two-input, open collector output NAND gate 212 for asserting the PS_ON1* signal to PS1 106. The paralleling board 104 also includes another two-input, open collector output NAND gate 214 for asserting the PS_ON2* signal to PS2 110. The NAND gates 212, 214 preferably have floatable outputs and are each preferably the 74HC03 NAND gate or the like, which have open-drain outputs. A floatable output generally refers to an open-collector for bipolar type devices or an open-drain for CMOS type devices, or any other type of suitable high impedance or tristatable output. Such devices pull their output at or near the ground or to a common voltage level in one logic state and allow the output to float to a high impedance state in another logic state. The PS_ON1* and PS_ON2* signals are both provided to corresponding inputs of a microprocessor 216 for monitoring the power supply status of PS1 106 and PS2 110. The microprocessor 216 may be any type of microprocessor or microcontroller used for control purposes.

The paralleling board 104 may optionally include detection circuits 230 and 232 for monitoring one or more of the respective power signals of the respective power buses 107 and 111. Generally, such detection circuitry monitors the current through, or the voltage across, current control devices for determining if power is being provided. If power loss is detected, the current control device is shut off to prevent current from flowing backwards from the paralleling board to the power supply. If power loss of PS1 106 is detected by the detection circuit 230, it asserts a power loss signal PL1 high. Likewise, if power loss of PS2 110 is detected by the detection circuit 232, it asserts a power loss signal PL2 high. The microprocessor 216 monitors the PG1 and PG2 signals, or the PL1 and PL2 signals, or even both sets of signals, and asserts the PF1 and PF2 signals to the computer 102 if the power loss was caused by the failure of a power supply as opposed to that power supply's AC source, as further described below.

The +5VFPC signal is provided to one end of a pullup resistor 228, having its other end connected to one input each of the NAND gates 212, 214 and also to the output of another two-input, open collector NAND gate 222. The microprocessor 216 asserts a signal PS_ON1N to the input of an inverter 218, having its output provided to the other input of the NAND gate 212. In a similar manner, the microprocessor 216 asserts a signal PS_ON2N to the input of another inverter 220, having its output provided to the other input of the NAND gate 214. A RESET signal from the computer 102 is provided to one end of a pulldown resistor 226 and to the input of an inverter 224. The other end of the pulldown resistor 226 is connected to ground, and the output of the inverter 224 is provided to one input of the NAND gate 222. A SYS_PWR_ON* signal is provided to the other input of the NAND gate 222.

Operation of the power loss detection system shown in FIG. 2 will now be described. During normal operation, both AC sources 108, 112 are connected and providing power, so that the standby power circuits 204 of both PS1 106 and PS2 110 are operating and asserting their respective +5VFP 1 and +5VFP2 signals. Thus, the +5VFPC signal is asserted high for providing power to SELV circuitry within the paralleling board 104. The computer 102 is on and the SYS_PWR_ON* signal is asserted low, so that the NAND gate 222 floats its output, which output is pulled high through the resistor 228 to +5VFPC. The microprocessor 216 asserts both the PS_ON1N and PS_ON2N signals low, so that the other inputs of both the NAND gates 212 and 214 are asserted high through the inverters 218, 222. Thus, the NAND gates 212 and 214 both assert their outputs low, so that the PS_ON1* and PS_ON2* signals are pulled low to turn on both PS1 106 and PS2 110. In this manner, both PS1 106 and PS2 110 are operating and providing power on their respective power buses 107, 111. The paralleling board 104 thus receives current from both PS1 106 and PS2 110 for providing power to the computer 102.

If one of the power supplies should stop providing power, such as PS1 106, then the other power supply, or PS2 110, increases its current output to provide sufficient power on the power bus 111 for powering the computer 102. PS1 106 deasserts the PG1 signal as detected by the microprocessor 216. Alternatively, the detection circuit 230 detects that PS1 106 is not providing power on the power bus 107 and asserts the PL1 signal, as detected by the microprocessor 216. The microprocessor 216 determines whether the problem is with the AC SOURCE1 108 or PS1 106 by monitoring the PS_ON1* signal. In particular, the microprocessor 216 deasserts the PS_ON1N signal high so that the NAND gate 212 floats its output and thus no longer asserts the PS_ON1* signal low. Again, an open-drain or open-collector output floats to a high impedance state if not asserted to either a high or low state. The only driving component for the PS_ON1* signal, other than the NAND gate 212, is the +5VFP1 signal of PS1 106 through its resistor 206.

Thus, the microprocessor 216 indirectly monitors the status of the +5VFP1 signal of PS1 106 through the PS_ON1* for determining the source of the failure of the power supply PS1 106. It is noted that during a power transition, the PS___ON1* signal may experience glitches so that a time delay is preferably inserted before determining the signal value. If the PS_ON1* signal eventually falls low or otherwise remains low after the NAND gate 212 floats its output, then the standby power circuit 204 within PS1 106 is not providing or is otherwise not asserting power on its +5VFP1 signal. This directly indicates that the AC SOURCE1 108 is not providing power to PS1 106. The computer 102, therefore, determines that the source of failure is the AC SOURCE1 108 rather than the power supply PS1 106.

Rather than indicating to the computer 102 to alert the user to call a service technician to replace or otherwise service the power supply PS1 106, the microprocessor 216 continually monitors the PS_ON1* signal until it is asserted high once again. This should occur as soon as the AC SOURCE1 108 returns, as long as PS1 106 is operational. Once the PS1_ON1* signal is pulled high indicating that PS1 106 is asserting its +5VFP1 signal high, the microprocessor 216 asserts the PS_ON1N signal low to turn on PS1 106. Current sharing between PS1 106 and PS2 110 then resumes as normal.

If, however, the PS_ON1* signal is eventually pulled high when the NAND gate 212 floats its output, this indicates that the standby power circuit 204 within the power supply PS1 106 is operating normally, which further indicates that the AC SOURCE1 108 is connected and providing power. Since PS1 106 is no longer providing power on the power bus 107, then the failure must have occurred within the main converter 202 of PS1 106. The microprocessor 216 therefore asserts the PF1 signal to inform the computer 102 that the failure has occurred within PS1 106, where the computer 102 correspondingly alerts the user to service or otherwise replace the power supply PS1 106.

Operation of the NAND gate 214 and the power supply PS2 110 is similar to that described above for the NAND gate 212 and PS1 106. If PS2 110 or its AC SOURCE2 112 should fail, then PS2 110 deasserts the PG2 signal. Alternatively, the detection circuit 232 asserts the PL2 signal. The microprocessor 216 respondingly deasserts the PS_ON2N signal and monitors the PS_ON2* signal to determine the source of the failure. As described above, after the microprocessor 216 deasserts the PS_ON2N signal high, the NAND gate 214 floats its output and the microprocessor 216 monitors the PS_ON2* signal. If the PS_ON2* signal eventually goes low or otherwise remains low, then the source of the failure is with the AC SOURCE2 112. Otherwise, if the PS_ON2* signal goes high or is eventually pulled high, then the AC SOURCE2 112 is operating normally, and the failure is with the power supply PS2 110. In the latter case, the microprocessor 216 asserts the PF2 signal indicating failure of PS2 110.

It is now appreciated that a power loss detection system according to the present invention distinguishes between failure of a power supply or its source on the secondary side of the power supply. This enables a computer or other electronic device to determine whether or not to indicate failure of the power supply. If the power supply itself has not failed, the computer waits for the power source to return and reactivates the power supply for normal operation.

Although a system and method for detecting the source of power loss in a redundant power supply system according to the present invention has been described in connection with a specific embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A power loss detection system for distinguishing between failure of a power supply versus failure of the power supply's power source, the power supply including a main converter for converting unregulated source power to regulated power, an activation circuit for turning on and off the main converter based on an active low activation signal, a standby power circuit for providing low power on a standby power signal whenever the power source is coupled and providing the source power, and a pullup device coupled between the activation and standby power signals for pulling the activation signal high to turn off the main converter if the activation signal is not asserted low, said power loss detection system comprising:

a detection circuit for monitoring the regulated power and for providing a power status signal indicative thereof; and a control circuit for asserting the activation signal low to turn on the main converter, for floating the activation signal to turn off the main converter, and for monitoring the activation and power status signals, wherein if the power status signal indicates power loss of the regulated power, said control circuit floats the activation signal to determine whether the standby power circuit is enabled;

wherein the activation signal remaining low indicates that the power source has failed and the activation signal going high indicates that the power supply has failed.

2. The power loss detection system of claim 1, wherein said control circuit includes:

a gate having a floatable output for coupling to the activation signal to assert or float the activation signal.

3. The power loss detection system of claim 1, wherein said control circuit asserts a failure signal to indicate that the power supply has failed if the activation signal goes high after the power status signal indicates power loss of the regulated power.

4. The power loss detection system of claim 1, wherein said control circuit continually monitors the activation signal to reassert the activation signal low to turn on the main converter if the activation signal remained low after it was floated in response to the power status signal indicating power loss of the regulated power.

5. A power loss detection system of a power system for distinguishing between failure of a power supply versus failure of a power source, comprising:

at least one power supply for receiving power from the power source, comprising:

a main converter for converting source power from the power source to regulated power and for providing regulated power;

an activation circuit coupled to said main converter and receiving an active low activation signal, wherein said activation circuit turns on said main converter when said activation signal is asserted low, but otherwise turns off said main converter;

a standby power circuit for providing low secondary power on a standby power signal whenever the power source is providing power; and a current device coupled between said standby power circuit and said activation circuit for pulling said activation signal to said standby power signal when said activation signal is not otherwise asserted low;

a detection circuit for monitoring said regulated power and for asserting a power status signal indicative thereof; and a control circuit for asserting said activation signal low to turn on said main converter, for floating said activation signal to turn off said main converter, and for monitoring said activation and power status signals, wherein if said power status signal indicates loss of said regulated power, said control circuit floats said activation signal to determine whether said standby power circuit is enabled;

wherein said activation signal being low indicates that the power source has failed and said activation signal being high indicates that said power supply has failed.

6. The power loss detection system of claim 5, wherein said current device comprises a pullup resistor.

7. The power loss detection system of claim 5, wherein said control circuit includes:

a gate having a floatable output for asserting said activation signal low or for otherwise floating said activation signal.

8. The power loss detection system of claim 5, wherein said control circuit asserts a failure signal to indicate that said power supply has failed if said activation signal goes high after said power status signal indicates loss of said regulated power.

9. The power loss detection system of claim 5, wherein said control circuit continually monitors said activation signal to reassert said activation signal low to turn on said main converter if said activation signal is low after it was floated in response to said power status signal indicating power loss of said regulated power.

10. The power loss detection system of claim 5, wherein the power system includes first and second power sources, further comprising:

said at least one power supply comprising first and second redundant power supplies for receiving unregulated power from the first and second power sources, respectively, for providing regulated power on first and second power buses based on first and second activation signals, and including first and second standby power circuits for coupling to the first and second power signals for providing first and second standby secondary power signals, respectively;

said detection circuit comprising detection circuitry within said main converter of each of said first and second redundant power supplies for providing first and second power status signals, respectively, for indicating status of power on said first and second power buses, respectively; and said control circuit including circuitry for receiving and monitoring said first and second activation signals and said first and second power status signals for determining whether said first and said second standby power circuits are enabled and for floating said first and second activation signals for distinguishing power failure either between said first power supply and the first power source, or between said second power supply and the second power source.

11. The power loss detection system of claim 10, wherein said control circuit includes:

first and second gates each having floatable outputs for asserting and for otherwise floating said first and second activation signals, respectively.

12. The power loss detection system of claim 10, wherein said control circuit asserts a first failure signal for indicating failure of said first power supply if said first activation signal goes high after being floated, and wherein said control circuit asserts a second failure signal for indicating failure of said second power supply if said second activation signal goes high after being floated.

13. The power loss detection system of claim 10, wherein said control circuit continually monitors said first activation signal to reassert said first activation signal low to turn on said main converter of said first power supply if said first activation signal remained low after it was floated in response to said first power status signal indicating power loss of regulated power on said first power bus, and wherein said control circuit continually monitors said second activation signal to reassert said second activation signal low to turn on said main converter of said second power supply if said second activation signal remained low after it was floated in response to said second power status signal indicating power loss of regulated power on said second power bus.

14. A redundant power supply system for providing power to an electronic device, comprising:

first and second power sources for providing first and second unregulated source signals;

first and second power supplies coupled to said first and second power sources, respectively, for converting said first and second unregulated source signals to regulated power on first and second power buses, respectively, each power supply comprising:

a main converter for converting received unregulated source power to regulated power and for providing said regulated power on a power bus;

an activation circuit coupled to said main converter and receiving an active low activation signal, wherein said activation circuit turns on said main converter when said activation signal is asserted low, but otherwise turns off said main converter;

a standby power circuit for providing secondary low power on a standby power signal whenever said received unregulated source power is available; and a pullup device coupled between said standby power circuit and said activation circuit for pulling said activation signal to said standby power signal when said activation signal is not asserted low;

first and second detection circuits coupled to said first and second power supplies, respectively, for monitoring said first and second power buses and for asserting first and second power status signal indicative of regulated power on said first and second power buses, respectively; and a control circuit for asserting said first and second activation signals low to turn on said main converter of said first and second power supplies, respectively, for floating said first and second activation signals to turn off said main converter of said first and second power supplies, respectively, and for monitoring said first and second activation and power status signals, wherein if a power status signal indicates loss of regulated power on a respective power bus, said control circuit floats a corresponding one of said first and second activation signals to determine whether a corresponding standby power circuit is enabled;

wherein if said corresponding one of said first and second activation signals remains low, then the corresponding power source has failed and if said corresponding activation signal goes high, the corresponding power supply has failed.

15. The redundant power supply system of claim 14, wherein said pullup device of said first and second power supplies comprise pullup resistors.

16. The redundant power supply system of claim 14, wherein said control circuit includes:

first and second gates each having floatable outputs for asserting and for otherwise floating said first and second activation signals, respectively.

17. The redundant power supply system of claim 14, wherein said control circuit asserts a first failure signal for indicating failure of said first power supply if said first activation signal goes high after being floated, and wherein said control circuit asserts a second failure signal for indicating failure of said second power supply if said second activation signal goes high after being floated.

18. The redundant power supply system of claim 14, wherein said control circuit continually monitors said first activation signal to reassert said first activation signal low to turn on said main converter of said first power supply if said first activation signal was low after it was floated in response to said first power status signal indicating power loss of regulated power on said first power bus, and wherein said control circuit continually monitors said second activation signal to reassert said second activation signal low to turn on said main converter of said second power supply if said second activation signal was low after it was floated in response to said second power status signal indicating power loss of regulated power on said second power bus.

19. The redundant power supply system of claim 14, wherein said first and second detection circuits and said control circuit are provided on a paralleling board for sharing power between said first and second power supplies.

20. The redundant power supply system of claim 19, wherein said first and second detection circuits are incorporated within said main converter of said first and second power supplies, respectively.

* * * * *